(12) United States Patent
Gupta et al.

(10) Patent No.: US 11,010,549 B2
(45) Date of Patent: *May 18, 2021

(54) LANGUAGE IDENTIFICATION FOR TEXT STRINGS

(71) Applicant: eBay Inc., San Jose, CA (US)

(72) Inventors: Akshay Gupta, San Jose, CA (US); Hrishikesh Joshi, Cupertino, CA (US); Saiyam Kohli, Redwood City, CA (US); Vidit Aggarwal, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,796

(22) Filed: Mar. 14, 2019

(65) Prior Publication Data

US 2019/0213248 A1 Jul. 11, 2019

Related U.S. Application Data

(63) Continuation of application No. 15/363,283, filed on Nov. 29, 2016, now Pat. No. 10,282,415.

(51) Int. Cl.
*G06F 40/263* (2020.01)
*G06F 40/58* (2020.01)
(Continued)

(52) U.S. Cl.
CPC .......... *G06F 40/263* (2020.01); *G06F 40/232* (2020.01); *G06F 40/295* (2020.01);
(Continued)

(58) Field of Classification Search
CPC .... G06K 9/6842; G06F 40/263; G10L 15/005
See application file for complete search history.

(56) References Cited

U.S. PATENT DOCUMENTS 7,593,843 B2 9/2009 Aue et al.
8,275,615 B2 9/2012 Kozat et al.
(Continued)

FOREIGN PATENT DOCUMENTS

WO 2018/102438 A1 6/2018

OTHER PUBLICATIONS

International Preliminary Report on Patentability received for PCT Application No. PCT/US2017/063753, dated Jun. 13, 2019, 9 pages.

(Continued)

*Primary Examiner* — Feng-Tzer Tzeng
(74) *Attorney, Agent, or Firm* — Holland & Hart LLP

(57) ABSTRACT

Aspects of the present disclosure include a system comprising a machine-readable storage medium storing at least one program and computer-implemented methods for detecting a language of a text string. Consistent with some embodiments, the method may include applying multiple language identification models to a text string. Each language identification model provides a predicted language of the text string and a confidence score associated with the predicted language. The method may further include weighting each associated confidence score based on historical performance of the corresponding language identification model in predicting languages of other text strings. The method may further include selecting a predicted language of the text string from among the multiple predicted languages provided by the multiple language identification models based on a result of the weighting of the confidence score associated with the particular predicted language.

20 Claims, 9 Drawing Sheets

(51) Int. Cl.
*G06F 40/232* (2020.01)
*G06F 40/295* (2020.01)
*G06K 9/68* (2006.01)
*G10L 15/00* (2013.01)

(52) U.S. Cl.
CPC ........... *G06F 40/58* (2020.01); *G06K 9/6842* (2013.01); *G10L 15/005* (2013.01)

(56) References Cited

U.S. PATENT DOCUMENTS

| | | | |
|---|---|---|---|
| 8,296,123 B2 | 10/2012 | Thayer et al. | |
| 8,380,488 B1* | 2/2013 | Liu | G06F 40/263 |
| | | | 704/4 |
| 8,972,260 B2 | 3/2015 | Weng et al. | |
| 9,424,597 B2 | 8/2016 | Chelly | |
| 10,282,415 B2 | 5/2019 | Gupta et al. | |
| 2004/0078191 A1* | 4/2004 | Tian | G06F 40/263 |
| | | | 704/9 |
| 2008/0059508 A1 | 3/2008 | Lu et al. | |
| 2012/0010886 A1* | 1/2012 | Razavilar | G10L 15/005 |
| | | | 704/246 |
| 2013/0173604 A1 | 7/2013 | Li et al. | |
| 2015/0161097 A1 | 6/2015 | Swerdlow et al. | |
| 2015/0279360 A1 | 10/2015 | Mengibar et al. | |
| 2016/0110340 A1 | 4/2016 | Bojja et al. | |
| 2017/0024663 A1* | 1/2017 | Liu | G06N 7/005 |
| 2018/0150448 A1 | 5/2018 | Gupta et al. | |

OTHER PUBLICATIONS

Written Opinion received for PCT Application No. PCT/US2017/063753, dated Feb. 20, 2018, 7 pages.
International Search Report received for PCT Application No. PCT/US2017/063753, dated Feb. 20, 2018, 3 pages.
Applicant Initiated Interview Summary received for U.S. Appl. No. 15/363,283, dated Jun. 22, 2018, 5 pages.
Final Office Action received for U.S. Appl. No. 15/363,283, dated Oct. 12, 2018, 16 pages.
Notice of Allowance Received for U.S. Appl. No. 15/363,283 dated Dec. 28, 2018, 10 pages.
Response to Final Office Action filed on Dec. 12, 2018, for U.S. Appl. No., dated Oct. 12, 2018, 13 pages.
Response to Non-Final Office Action filed on Jun. 27, 2018, for U.S. Appl. No. 15/363,283, dated Mar. 30, 2018, 12 pages.
Non-Final Office Action Received for U.S. Appl. No. 15/363,283 dated Mar. 30, 2018, 15 pages.

* cited by examiner

LANGUAGE IDENTIFICATION FOR TEXT STRINGS

CLAIM OF PRIORITY

This application is a continuation of U.S. patent application Ser. No. 15/363,283, filed on Nov. 29, 2016, which is incorporated herein by reference in its entirety.

TECHNICAL FIELD

The present disclosure generally relates to the technical field of special-purpose machines that perform natural language processing, including computerized variants of such special-purpose machines and improvements to such variants, and to the technologies by which such special-purpose machines become improved compared to other special-purpose machines that perform natural language processing. In particular, the present disclosure addresses systems and methods for improving language identification of text strings.

BACKGROUND

Many websites allow users to input text in their native language. Thus, these websites must be capable of processing text entered in a variety of different input languages. To be able to process the variety of input languages, these websites must first identify what the input language is before undertaking more substantive processes with the input. For example, prior to being able to translate one language to another (e.g., English to Spanish), the website must first identify the language that is to be translated. As another example, services such as spam and profanity detection, which are employed by many websites that allow users to submit content, are language-specific, and hence, these websites must have knowledge of the input language prior to invoking the appropriate service. While many techniques for language identification exist, each technique varies in accuracy depending on the type and length of the input text. For example, some of these techniques may perform well when applied on long text, but do not perform as well on short text.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
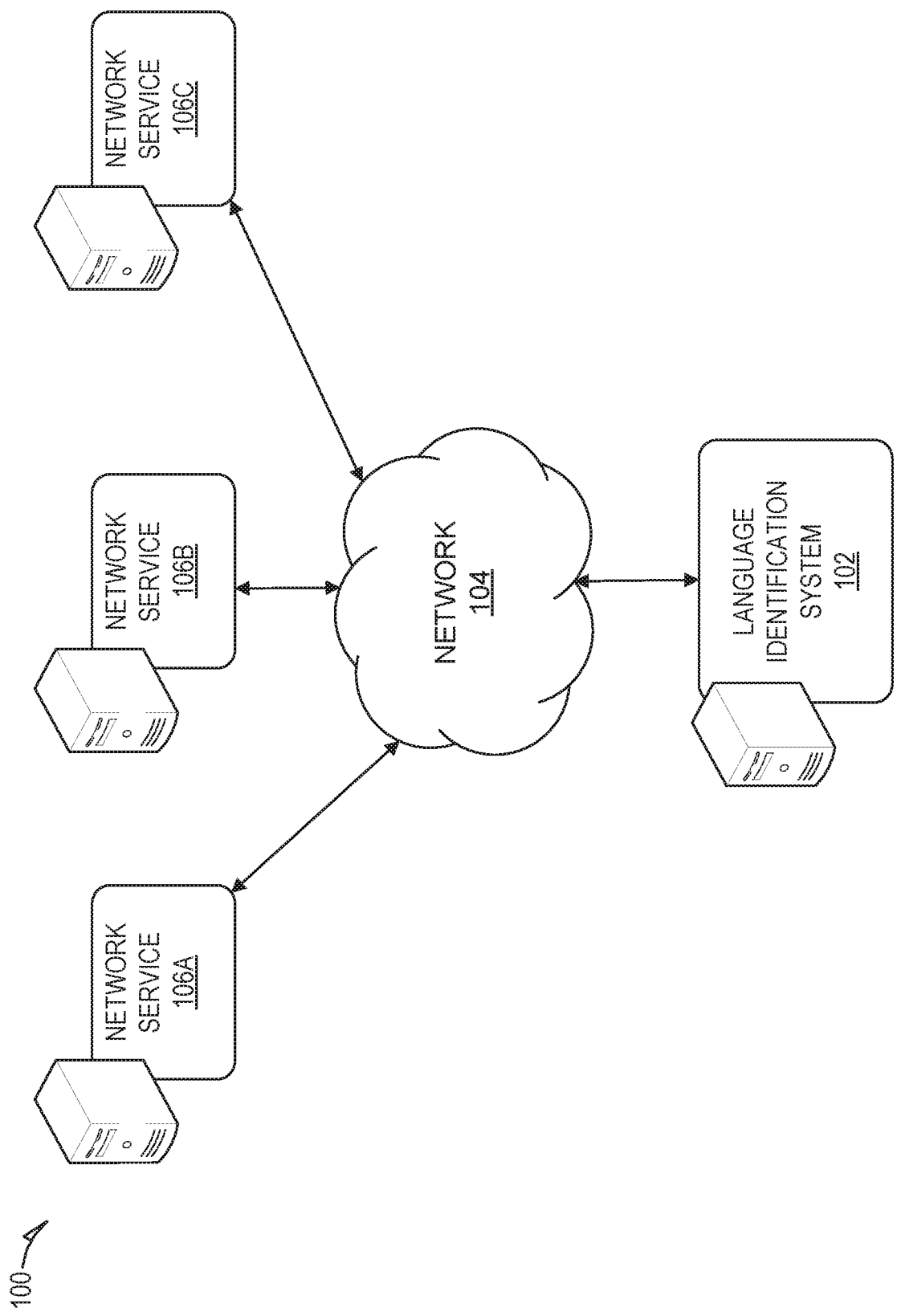
FIG. 1 is a network diagram illustrating a network environment in which a language identification system may be implemented, according to some example embodiments.

Reference will now be made in detail to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover such alternatives, modifications, and equivalents as may be included within the scope of the disclosure. In the following description, specific details are set forth in order to provide a thorough understanding of the subject matter. Embodiments may be practiced without some or all of these specific details.

Aspects of the present disclosure include a system and methods for language identification of text. Consistent with some embodiments, the system receives a text string (e.g., any combination of letters, symbols, numbers, spaces, and punctuation) that may be in any number of different languages (e.g., English, Spanish, French, German). The system includes multiple language identification models, each of which utilizes a different technique to predict a language of the text string and provide a confidence score associated with the predicted language. The system applies each of the language identification models to the text string, and each model, in turn, provides a predicted language and a confidence score associated with the predicted language. The system further includes a gradient boosting machine (GBM) that weights each of the confidence scores based on historical performance of the corresponding model in accurately predicting a language of similar text strings as the current input. The system selects one of the predicted languages provided by the multiple language identification models based on the weighted confidence scores. Weights are also generated based on past input performance.

In this way, the system may apply multiple language identification techniques to any given input text string and predict a weighted average of these where weights are determined dynamically by prior application of the technique to similar text strings. By applying multiple language identification models and using their weighted average, the system provides an improvement to conventional systems that utilize only a single language identification model. In particular, the case-by-case selection of a language prediction from a particular language identification model from among multiple applied language identification models improves the overall accuracy of language predictions as compared to conventional systems that provide limited accuracy and constrained performance when applied to certain input languages and text string lengths. For example, the methodologies described in the present disclosure may provide a significant improvement in cases where the input text string is short (e.g., ranging from a few words to a single sentence), which is a hard problem to solve for language identification. Further, the methodologies described in the present disclosure provide the significant improvement in language identification for short text without compromising the quality of results on longer text.

With reference to FIG. 1, an example network environment 100 is shown. The network environment 100 includes a language identification system 102 in communication over a network 104 with network services 106A-C. As discussed below, the language identification system 102 and network services 106A-C may be, or include, a machine such as a server or any other type of computing machine. The language identification system 102 and the network services 106A-C may communicate over the network 104 via one or more Application Programming Interfaces (APIs). One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a Wi-Fi® network, a WiMax network, another type of network, or a combination of two or more such networks.

The language identification system 102 is configured to receive a text string and predict a language of the text string. The language identification system 102 may receive the text string from one of the network services 106A-C or from an external system or service in communication with the language identification system 102 over the network 104. In an example, the network service 106A provides a web search service that includes a web search engine to search for information related to search queries input by users. In this example, the network service 106A may pass received search queries to the language identification system 102 prior to searching for information. In another example, the network service 106B provides a content publication service that receives submissions of content that includes text. In this example, the network service 106B may provide such text to the language identification system 102 prior to performing processing of such text such as for spam, gibberish (e.g., incoherent or nonsensical phrases), or profanity detection.

Upon predicting the language of a text string, the language identification system 102 communicates the predicted language (e.g., through transmission of an electronic data packet) to at least one of the network services 106A-C or to an external service in communication with the language identification system 102 over the network 104.

Figure 2:
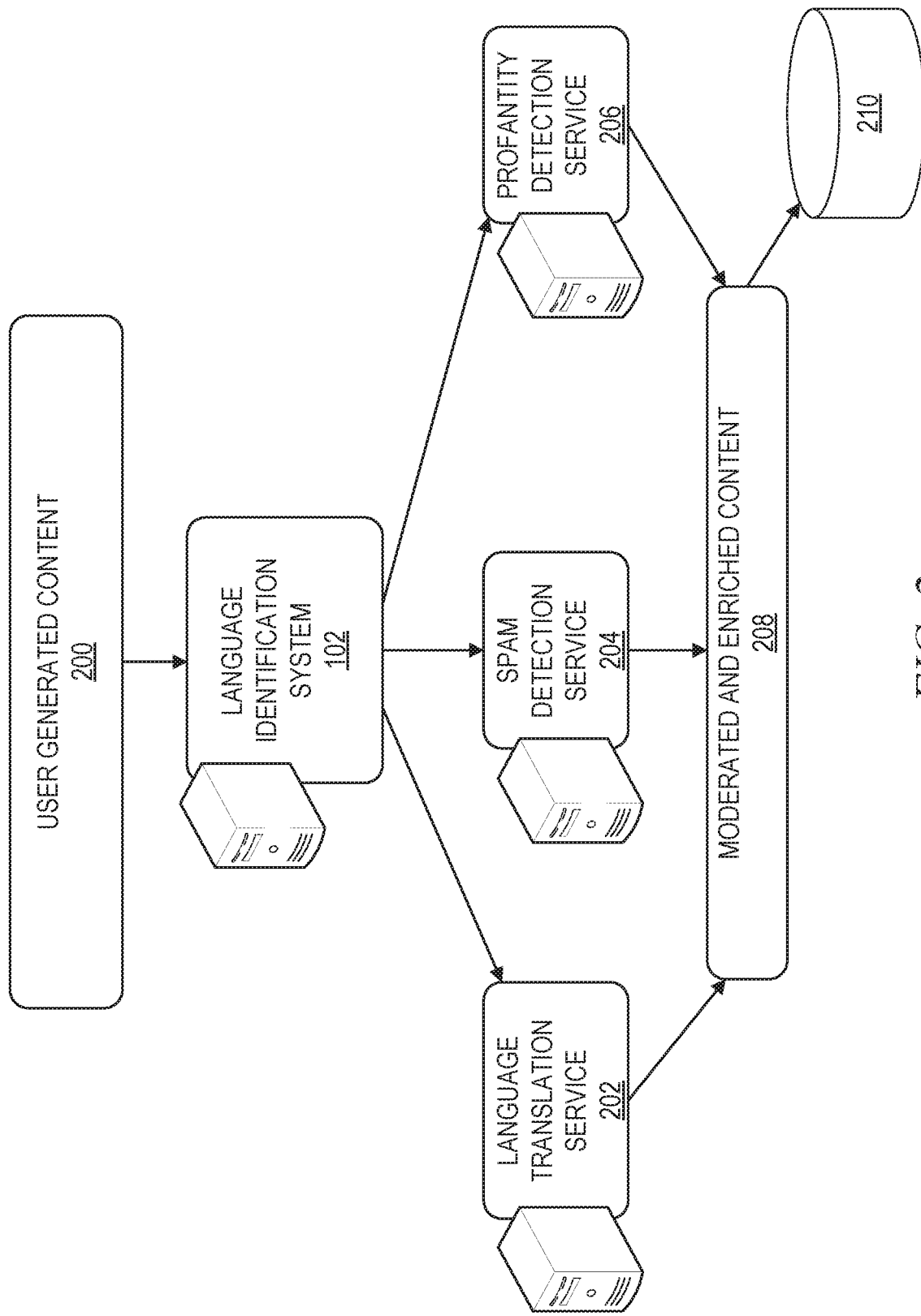
FIG. 2 is a diagram illustrating example interactions of the language identification system with network services, according to some example embodiments.

As an example, FIG. 2 illustrates interactions of the language identification system 102 with network services, in accordance with some example embodiments. As shown, user generated content 200 (e.g., reviews, listings, and user messages) that includes text is received as input by the language identification system 102. The user generated content 200 may be provided to the language identification system 102 by one of the network services 106A-C. The language identification system 102 analyzes the user generated content 200 to identify (e.g., through machine-learned prediction) a language of the text (e.g., English, Spanish, or French). A language translation service 202 (e.g., network service 106A), a spam detection service 204 (e.g., network service 106B), and a profanity detection service 206 (e.g., network service 106C) also receive the user generated content 200 as input along with the language prediction provided by the language identification system 102. Each of the language-based services provided (the language translation service 202, the spam detection service 204, and the profanity detection service 206) relies upon knowledge of the input language to process the text of the user generated content 200. The application of the language translation service 202, the spam detection service 204, and the profanity detection service 206 to the user generated content 200 results in moderated and enriched content 208 (e.g., translated content, spam-less content, and/or content with profanity removed) that may be electronically published by a network-based content publisher. The moderated and enriched content 208 is also stored in persistent storage 210 (e.g., a computer-readable storage device).

Figure 3:
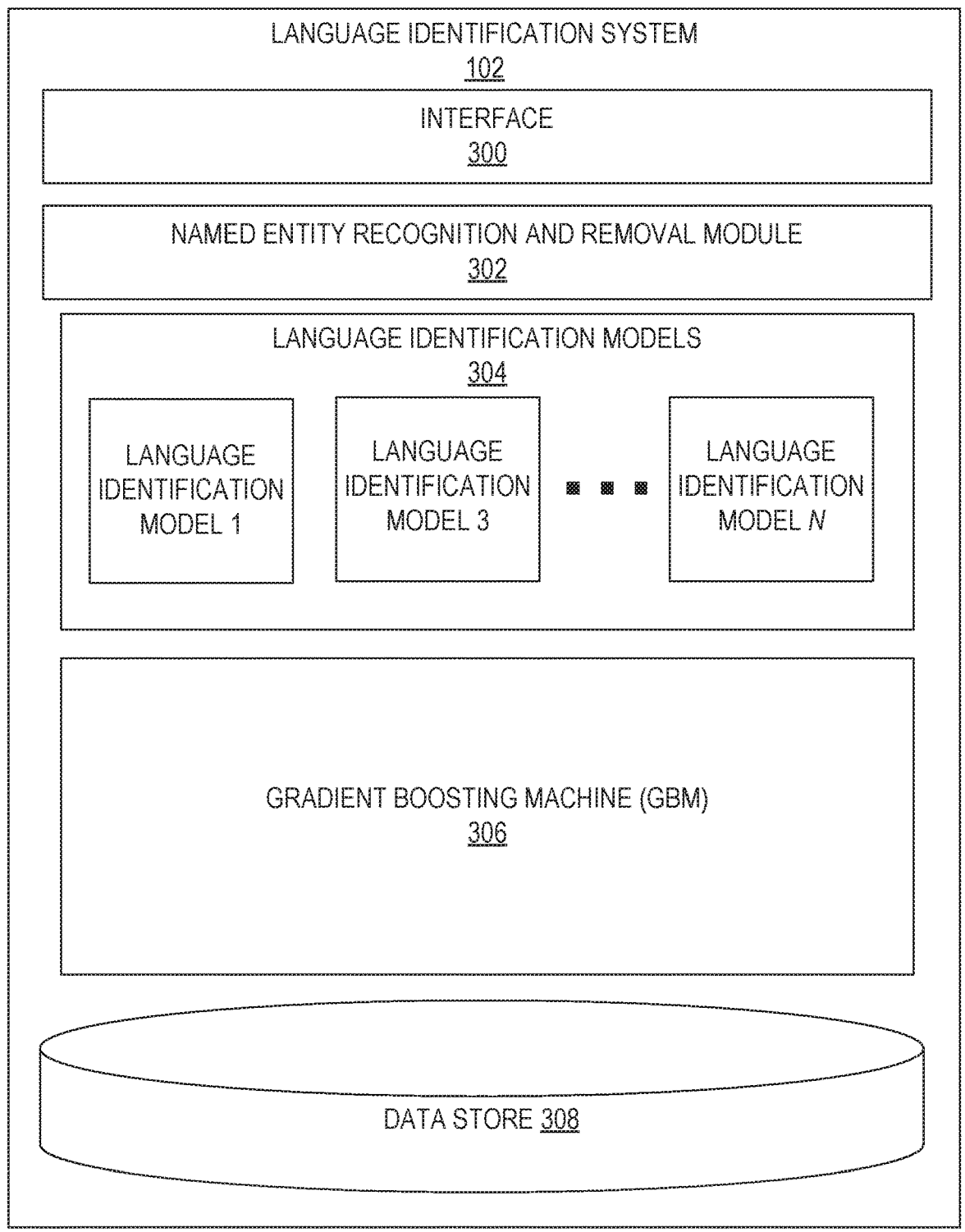
FIG. 3 is a system diagram illustrating functional components of a language identification system, according to some example embodiments.

FIG. 3 is a system diagram illustrating functional components of the language identification system 102, according to some example embodiments. To avoid obscuring the inventive subject matter with unnecessary detail, various functional components (e.g., modules, engines, and databases) that are not germane to conveying an understanding of the inventive subject matter may have been omitted from FIG. 3. However, a skilled artisan will readily recognize that various additional functional components may be supported by the language identification system 102 to facilitate additional functionality that is not specifically described herein.

As shown, the language identification system 102 includes an interface module 300, a named entity recognition and removal module 302, language identification models 304, a gradient boosting machine (GBM) 306, and a data store 308. The above referenced functional components of the language identification system 102 are configured to communicate with each other (e.g., via a bus, shared memory, a switch, or APIs). Any one or more of the functional components illustrated in FIG. 3 and described herein may be implemented using hardware (e.g., a processor of a machine) or a combination of hardware and software. For example, any one of the components described herein may configure a processor to perform the operations described herein for that component. Moreover, any two or more of these components may be combined into a single component, and the functions described herein for a single component may be subdivided among multiple components. Furthermore, according to various example embodiments, any of the functional components illustrated in FIG. 3 may be implemented together or separately within a single machine, database, or device or may be distributed across multiple machines, databases, or devices.

The interface module 300 includes one or more APIs that facilitate communication (e.g., an exchange of data) between the language identification system 102 and the network services 106A-C as well as external systems and services. The interface module 300 may receive requests (e.g., requests to identify a language of a text) from the network services 106A-C, and communicate appropriate responses (e.g., predicted languages of the received text) to the network services 106A-C.

In some instances, the text strings provided to the language identification system 102 for language identification may include one or more named entities (e.g., proper nouns) that may be or appear to be in a different language than the remainder of the text string. In these instances, named entities are usually referred to in their native language rather than being translated to the language used to refer to them. For example, despite a text string being in Spanish, a reference to a brand such as "NEW BALANCE" included in the text string is likely to remain in English. In these instances, a reference to a named entity of a first language being included in a text string of a second language may decrease the accuracy of the language prediction of the text string. To improve the accuracy of language predictions in these instances, the language identification system 102 includes the named entity recognition and removal module 302, which is configured to identify and remove named entities (e.g., proper nouns) in text strings. The named entity recognition and removal module 302 may identify named entities by parsing text strings to identify individual keywords and comparing the keywords to a repository of named entities. Upon identifying a named entity in a text string, the named entity recognition and removal module 302 removes the named entity from the text string prior to further processing.

The language identification models 304 include multiple language identification models (e.g., language identification models 1-N) configured to predict a language of input text strings when applied thereto. Each of the language identification models 1-N is configured to provide a predicted language of an input text string and provide a confidence score associated with the predicted language. The confidence score provided by each of the language identification models 1-N indicates a likelihood that the language predicted by the corresponding language identification model is accurate. Each of the language identification models 1-N may use different techniques for predicting languages and assigning confidence scores, and each language identification module 1-N may be particularly suited for certain languages, phrases, and/or text string lengths.

As an example, the language identification models 1-N may include or utilize any one of several known language identification techniques such as Compact Language Detector 2 (CLD2), Apache Tika, Natural Language Toolkit (NLTK) LangID, a support vector machine trained on language data, or any other such language identification technique. Consistent with some embodiments, the language identification models 1-N may also include a location identifier model that uses the geographic origin of the text string in identifying the language of the text string. The location identifier model assumes that the primary language of the geographic origin of the text string is the language of the text string. For example, if the geographic origin of a text string is Spain, the location identifier model predicts Spanish as the language of the text string. The location identifier model may determine the geographic origin of the text string from a site identifier included along with the text string in a request for language identification received by the language identification system 102 from one of the network services 106A-C.

The GBM 306 is configured to assign a weight, referred to as a gradient boosting value, to each confidence score provided by the language identification models 304. The gradient boosting value assigned to a particular confidence score by the GBM 306 is based on previous performance of the corresponding language identification model (e.g., language identification models 1-N) for similar inputs as the current one. More specifically, the GBM 306 assigns a gradient boosting value to a confidence score based on an accuracy of the corresponding language identification model in predicting a language of a similar text string. Accordingly, in assigning gradient boosting values to confidence scores associated with predicted languages of a text string, the GBM 306 may map the text string to one or more similar text strings to which the language identification models 304 have been previously applied (e.g., a text string included in a training data set used to train the GBM 306). The GBM 306 may further determine an accuracy of each of the language identification models 304 by comparing the predicted language output by each model with a known language of the similar text string. The GBM 306 determines the gradient boosting value for each model based on the determined accuracy of each model in predicting the language of the similar text string.

As noted above, each of the language identification models 304 provides a predicted language of the text string. The language identification system 102 treats the set of predicted languages (e.g., comprising the predicted language provided by each of the language identification models 304) as candidate language predictions. The GBM 306 selects a predicted language from among the candidate language predictions for output by the language identification system 102 (e.g., to provide to a language-based service such as the network services 106A-C). The GBM 306 selects the predicted language based on the weighted confidence scores (e.g., the confidence scores with applied gradient boosting values) associated with the candidate language predictions. For example, the GBM 306 may select the candidate language prediction having the highest weighted confidence score as the predicted language to be output by the language identification system 102.

The data store 308 includes a computer-readable storage device to store data related to the functioning of the language identification system 102. For example, the data store 308 may serve as storage (e.g., a cache) for input text strings and their identified language. The storage is also used to store the GBM model. For example, the data store 308 may store a plurality of gradient boosting values used to weight confidence scores.

Figure 4:
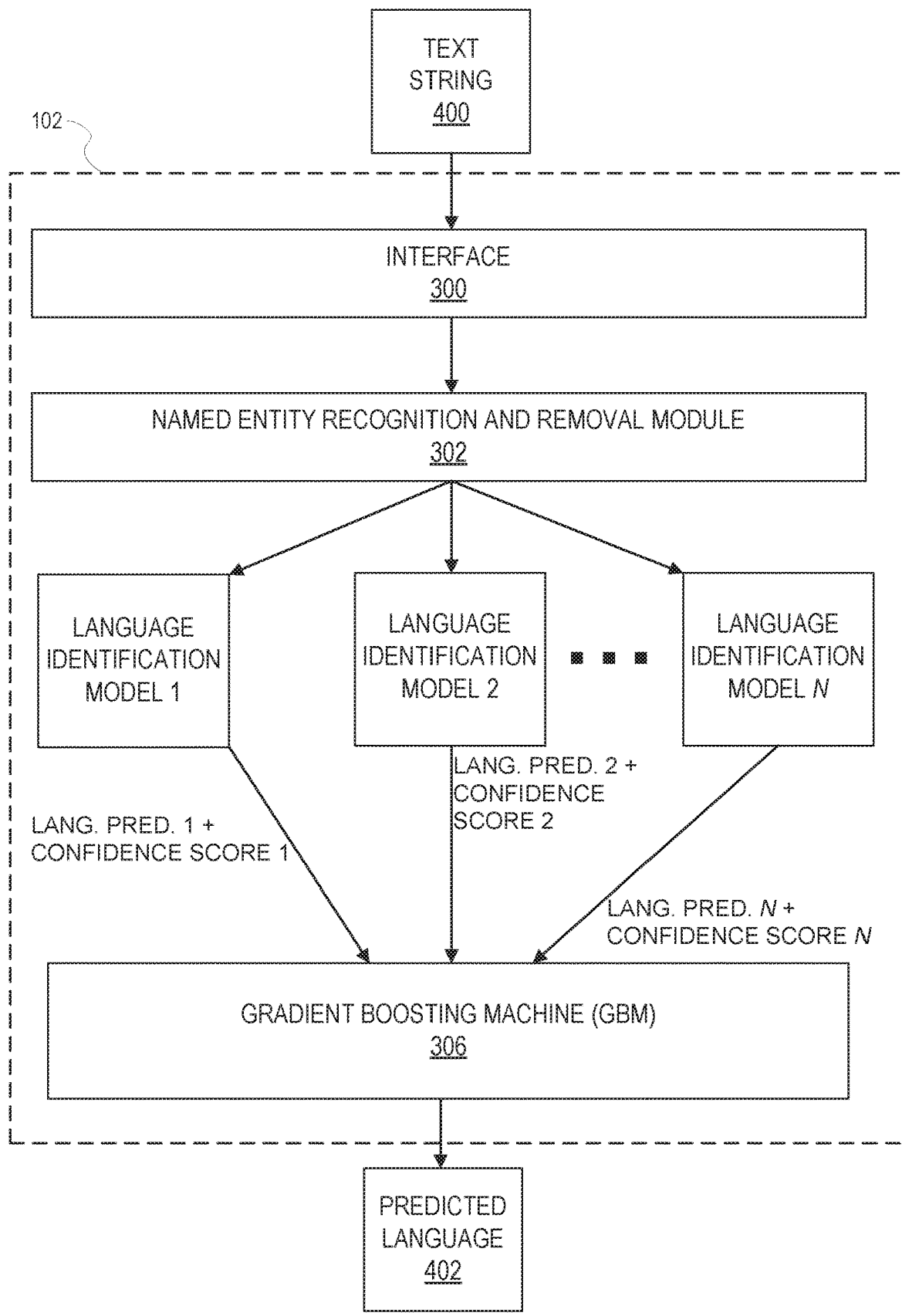
FIG. 4 is a data flow diagram illustrating the functioning of the functional components of the language identification system in providing a language identification service, according to some example embodiments.

With reference to FIG. 4, a text string 400 is received as input by the interface module 300 and provided to the named entity recognition and removal module 302. The text string 400 may be communicated to the language identification system 102 from one of the network services 106A-C as part of a request for language identification. Accordingly, the text string 400 may be, for example, a search query input by a user or a portion of textual content submitted for electronic publication. The named entity recognition and removal module 302 analyzes the text string 400 to identify any named entities (e.g., proper nouns such as brand names) and removes any such information prior to providing the text string 400 to the language identification models 1-N.

Each of the language identification models 304 is applied to the text string 400, and in turn, each of the language identification models 304 produces a candidate language prediction for the text string 400 and a confidence score associated with the language prediction. As shown, the GBM 306 receives the language predictions and confidence scores, and weights each confidence score according to a gradient boosting value determined based on historical performance of the corresponding language identification model 304.

The GBM 306 selects one of the candidate language predictions produced by the language identification models 304 based on the weighted confidence scores generated by the GBM 306. The candidate language prediction selected by the GBM 306 is output by the language identification system 102 as a predicted language 402. The interface module 300 may provide the predicted language 402 to one or more language-based services, such as the network services 106A-C, for subsequent processing (e.g., language translation, spam detection, gibberish detection, or profanity detection).

Figure 5:
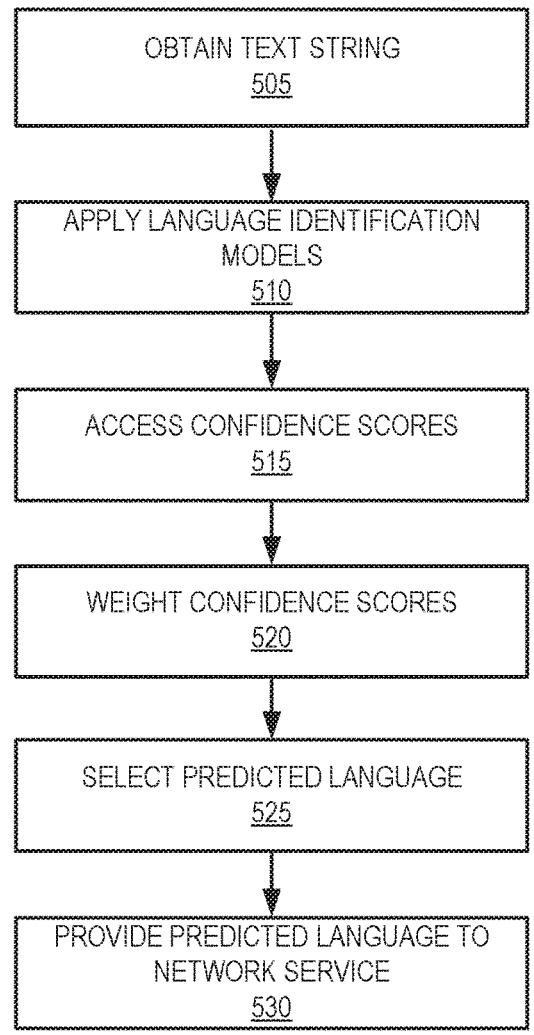
FIGS. 5-7 are flow charts depicting operations of the language identification system in performing a method of providing a language identification service, according to example embodiments.

FIG. 5 is a flow chart depicting operations of the language identification system 102 in performing a method 500 of providing a language identification service, according to example embodiments. The method 500 may be embodied in computer-readable instructions for execution by one or more processors such that the operations of the method 500 may be performed in part or in whole by the language identification system 102; accordingly, the method 500 is described below by way of example with reference thereto. However, it shall be appreciated that at least some of the operations of the method 500 may be deployed on various other hardware configurations and the method 500 is not intended to be limited to the language identification system 102.

At operation 505, the interface module 300 obtains the text string 400. The text string 400 may include any combination of letters, symbols, numbers, spaces, and punctuation. The text string 400 may be in any number of different languages (e.g., Spanish, English, French, German, Russian). The text string 400 may be a user input provided to one of the network services 106A-C, and in turn, provided to the language identification system 102, via an API, as part of a request to identify the language of the text string 400 for purposes of further processing.

At operation 510, the language identification system 102 applies multiple language identification models 304 to the text string 400. Each of the language identification models 304 analyzes the text string 400 to provide a candidate language prediction and a confidence score associated with the candidate language prediction. The candidate language prediction includes a predicted language for the text string 400 (e.g., Spanish, English, French, German, Russian). The confidence score provides a measure of the likelihood that the candidate language prediction is accurate.

At operation 515, the GBM 306 accesses the confidence scores produced by the language identification models 304. At operation 520, the GBM 306 weights each confidence score using respective gradient boosting values associated with the corresponding language identification model. Each respective gradient boosting value is determined based on historical performance of the corresponding language identification model in predicting languages of similar text strings as the current input (e.g., a text string that is similar to the text string 400). In weighting each confidence score, the GBM 306 may multiply the confidence score by the gradient boosting value.

At operation 525, the GBM 306 selects a predicted language 402 for the text string 400 from the candidate language predictions produced by the language identification models based on the weighted confidence scores (e.g., the confidence scores multiplied by respective gradient boosting values). For example, the GBM 306 may select the candidate language prediction having the highest weighted confidence value as the predicted language 402 of the text string 400.

At operation 530, the interface module 300 provides the predicted language 402 of the text string 400 to at least one of the network services 106A-C. In providing the predicted language 402, the interface module 300 may transmit (e.g., via an appropriate API call) an electronic message or data packet over the network 104 to at least one of the network services 106A-C for subsequent processing thereby. For example, the network services 106A-C may utilize the predicted language 402 to perform language-based services such as language translation, spam detection, profanity detection, or gibberish detection.

Figure 6:
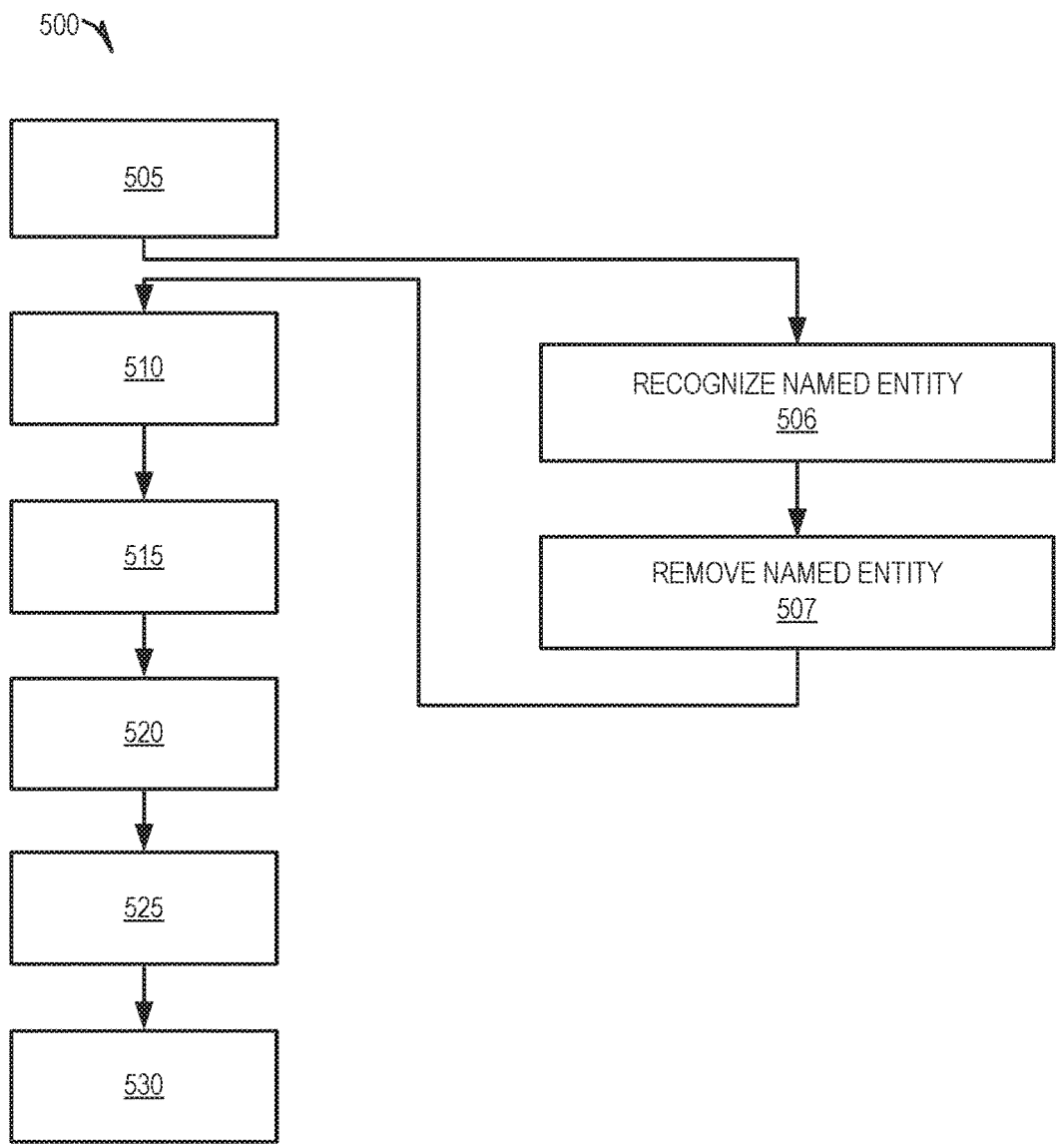

As shown in FIG. 6, the method 500 may include operations 506 and 507. In some example embodiments, operations 506 and 507 included in the method 500 may be performed prior to, or as part of (e.g., a precursor task, a subroutine, or a portion), operation 510 of the method 500, in which the language identification system 102 applies the language identification models 304 to the text string 400.

At operation 506, the named entity recognition and removal module 302 recognizes a named entity (e.g., a proper noun such as a brand name) included in the text string 400. The named entity recognition and removal module 302 may use known natural language processing techniques to analyze the text string 400 and parse out the text string 400 to identify individual keywords. In some embodiments, the named entity recognition and removal module 302 may recognize named entities based on whether the text is a particular named entity, like a brand, product, color etc. In some embodiments, the named entity recognition and removal module 302 may compare the individual keywords to a repository of named entities to identify the named entity in the text string 400.

At operation 507, the named entity recognition and removal module 302 removes the identified named entity from the text string 400. As noted above, because named entities may be in a different language than the remainder of the text string (e.g., a brand name in English included in a text string in Spanish), the inclusion of named entities in text strings 400 may negatively affect the accuracy of the language predictions provided by the language identification models 304. Thus, by removing the named entity from the text string 400, the named entity recognition and removal module 302 improves the accuracy of the language predictions provided by the language identification models 304.

Figure 7:
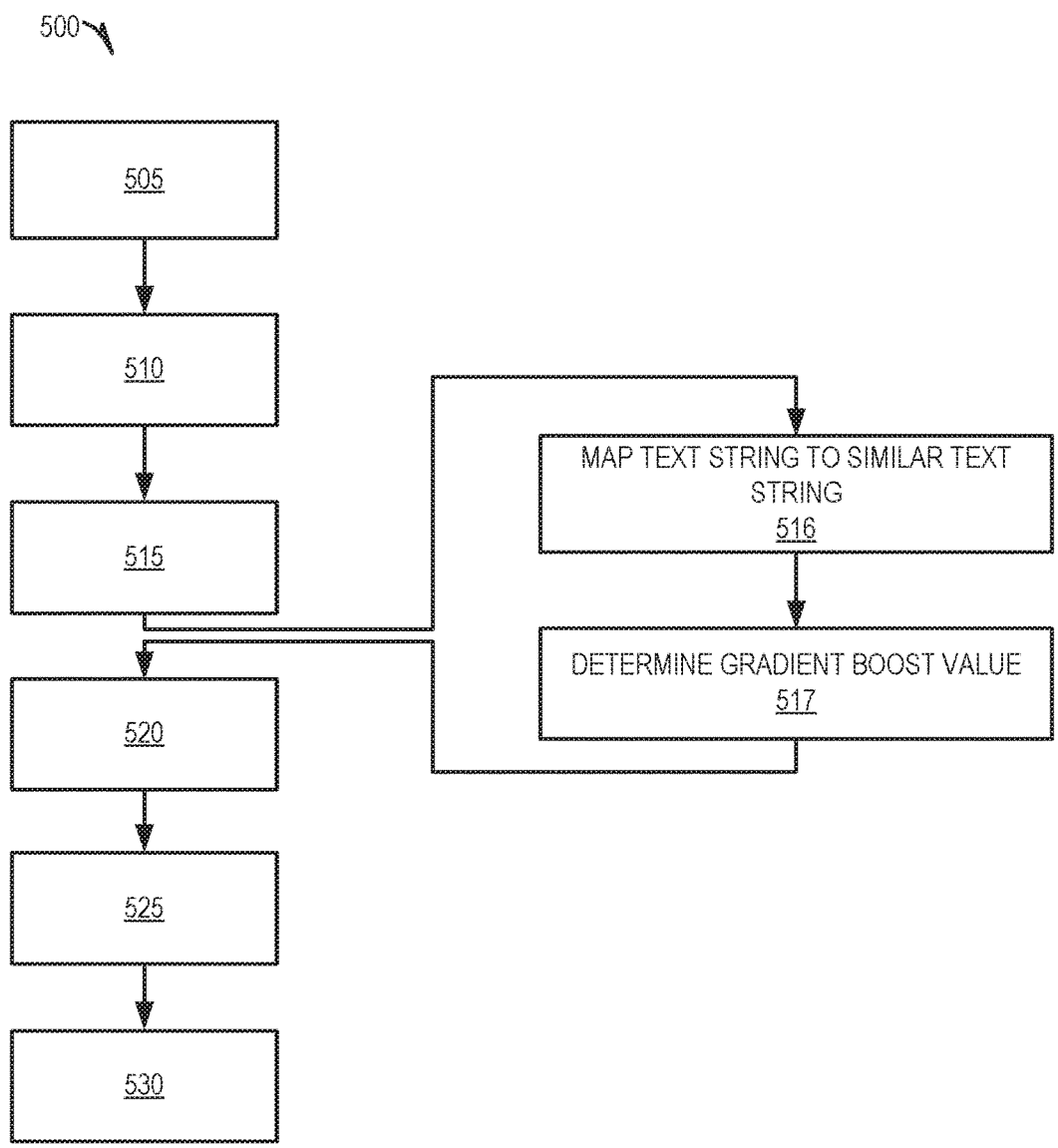

As shown in FIG. 7, the method 500 may include operations 516 and 517. In some example embodiments, operations 516 and 517 included in the method 500 may be performed prior to or as part of (e.g., a precursor task, a subroutine, or a portion) operation 520 of the method 500, in which the GBM 306 weights each of the confidences scores.

At operation 516, the GBM 306 maps the text string 400 to one or more similar text strings to which the language identification models 304 have previously been applied. The one or more similar text strings may be included in a training data set (e.g., a collection of text strings of known languages) used to train the GBM 306 by determining the accuracy of the language identification models 304 under various circumstances (e.g., different languages and different text string lengths). Further details regarding the training of the GBM 306 are discussed below in reference to FIG. 8, according to some example embodiments.

As part of mapping the text string 400 to the similar text string, the GBM 306 creates, in an offline process, a feature space using the corpus of training data, which includes the one or more similar text strings among others. At run-time, when the GBM 306 receives the text string 400, the GBM 306 maps input within the feature space to identify the one or more similar text strings.

At operation 517, the GBM 306 determines a gradient boosting value for each of the language identification models 304. For example, the GBM 306 may determine a first gradient boosting value for the language identification model 1, a second gradient boosting value for the language identification model 2, and an Nth gradient boosting value for the language identification model N. For a given language identification model, the GBM 306 determines the gradient boosting value based on the accuracy of the language identification model in predicting the known language of the similar text string. In some embodiments, the GBM 306 may calculate gradient boosting values in an offline process and the GBM 306 may access the appropriate gradient boosting value (e.g., from the data store 308) at run-time based on the similar text string to which the input text string 400 (the text string obtained at operation 505) is mapped.

Figure 8:
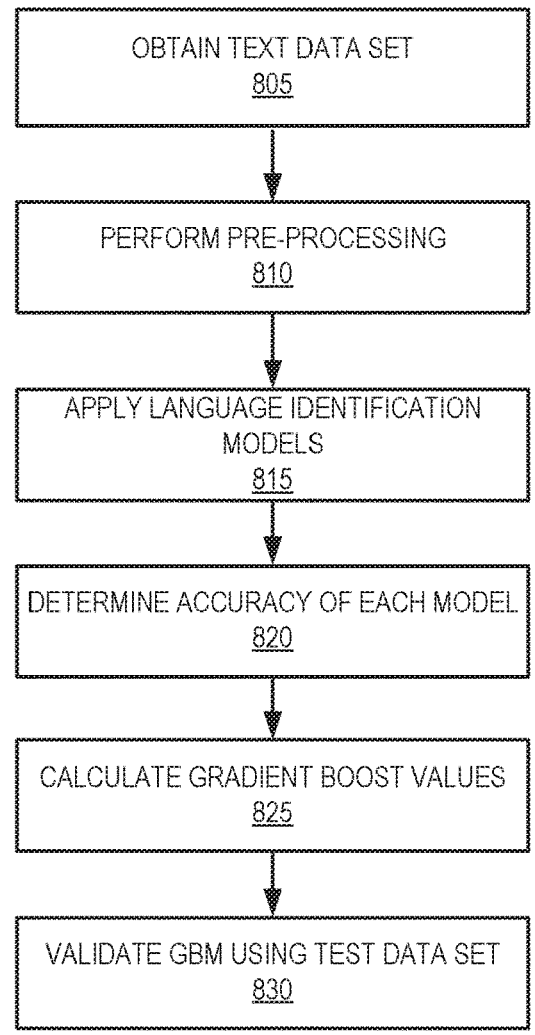
FIG. 8 is a flow chart depicting operations of a method for training a gradient boosting machine, which is provided as part of the language identification system, according to some example embodiments.

FIG. 8 is a flow chart depicting operations of a method 800 for training the gradient boosting machine 306, which is provided as part of the language identification system 102, according to some example embodiments. The method 800 may be embodied in computer-readable instructions for execution by one or more processors, such that the operations of the method 800 may be performed in part or in whole by the language identification system 102; accordingly, the method 800 is described below by way of example with reference thereto. However, it shall be appreciated that at least some of the operations of the method 800 may be deployed on various other hardware configurations and the method 800 is not intended to be limited to the language identification system 102. Consistent with some embodiments, the method 800 may be performed in an offline manner prior to or as part of the operation of the language identification system 102 in performing the method 500. Further, the method 800 may be periodically repeated so as to retrain the GBM 306 on a periodic basis.

At operation 805, the language identification system 102 obtains a text data set for training the GBM 306. The text data set includes a collection of text strings of various lengths and in various known languages. The text data set may include text strings from various sources including textual content such as blogs, social network posts, and product listings, as well as user reviews and comments associated with such content. The text data set may include human-annotated metadata that includes a known language for each text string.

At operation 810, the language identification system 102 performs pre-processing of the text data set. As part of the pre-processing, the named entity recognition and removal module 302 may recognize and remove named entities from each of the text strings in the text data set. Further, some of the training data is broken into smaller sentences, so that the system can train on short text strings. Further, the language identification system 102 may interleave data from different languages to create an even distribution of languages within the text data set. In doing so, the language identification system 102 may remove one or more text strings from the text data set to ensure the even distribution of languages in the text data set. Additionally, the language identification system 102 may divide the text data set into a training data set and a test data set for validating of the trained GBM 306.

At operation 815, the language identification system 102 applies the multiple language identification models 304 to each text string 400 in the training data set. Each of the language identification models 304 provides a language prediction for each text string included in the training data set.

At operation 820, the GBM 306 determines an accuracy of each of the language identification models 304 in predicting a language of each of the text strings included in the training data set. For each language identification model 304, the GBM 306 determines the accuracy of the language prediction of the model for a given text string by comparing the language prediction of the model with the known language of the text string.

At operation 825, the GBM 306 calculates a gradient boosting value for each language identification model 304 for each text string in the training data set. For each language identification model 304, the GBM 306 calculates a gradient boosting value for a given text string based on the determined accuracy of the model's language prediction of the text string. The GBM 306 may store each gradient boosting value (e.g., in the data store 308) for subsequent use during run-time processing (e.g., at operation 517 of the method 500).

At operation 830, the language identification system 102 validates the GBM 306 using the test data set. In validating the GBM 306, the language identification system 102 may execute the method 500, where the text strings included in the test data set are used as the input text strings. For each text string in the test data set, the language identification system 102 may compare the predicted language selected by the GBM 306 to the known language of the text string to verify the accuracy of the GBM 306. In other words, in validating the GBM 306, the language identification system 102 may: apply the multiple language identification models 304 to each text string in the test data set; weight the confidence score of each language prediction provided by each of the language identification models 304 according to the gradient boosting values calculated at operation 825; select the language prediction having the highest associated weighted confidence score for each text string; and verify the accuracy of the GBM 306 by comparing the selected language prediction of each text string with the known language of each text string.

Machine Architecture

Figure 9:
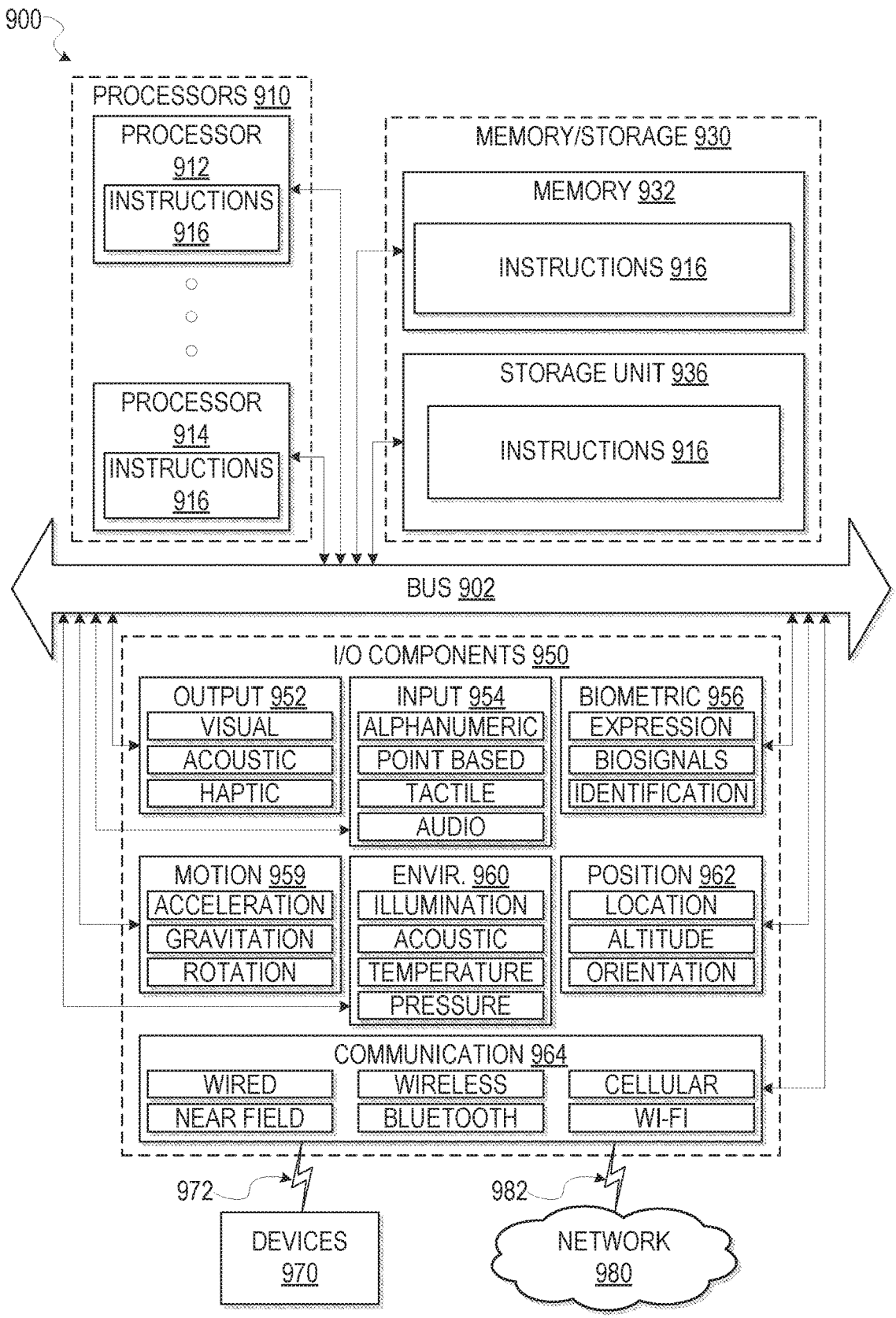
FIG. 9 is a diagrammatic representation of a machine in the example form of a computer system within which a set of instructions for causing the machine to perform any one or more of the methodologies discussed herein may be executed.

FIG. 9 is a block diagram illustrating components of a machine 900, according to some example embodiments, able to read instructions from a machine-readable medium (e.g., a machine-readable storage device) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may include executable code that causes the machine 900 to execute any one of the methods 500 or 800. These instructions transform the general, non-programmed machine into a particular machine (e.g., the language identification system 102) programmed to carry out the described and illustrated methodologies in the manner described herein. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. By way of non-limiting example, the machine 900 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 912 and a processor 914 that may execute the instructions 916. The term "processor" is intended to include a multi-core processor 910 that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine (e.g., processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se. The "machine-readable medium" may also be referred to as a "machine-readable storage device" or "hardware storage device."

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), acoustic sensor components (e.g., one or more microphones that detect background noise), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972 respectively. For example, the communication components 964 may include a network interface component or other suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between or among such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Language

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
   one or more processors of a machine; and
   a machine-readable storage medium storing a set of instructions that, when executed by the one or more processors, cause the machine to perform operations comprising:
   accessing a plurality of candidate language predictions for a first text string produced as a result of applying a plurality of language identification models to the first text string, each of the plurality of candidate language predictions having an associated confidence score produced by a corresponding language identification model, each confidence score indicating a likelihood that the corresponding candidate language prediction is accurate;
identifying, based on the first text string, a second text string from a set of one or more text strings previously evaluated by the plurality of language identification models;
selecting, from among the plurality of candidate language predictions, a language prediction of the first text string produced by a language identification model from among the plurality of language identification models based on a confidence score associated with the language prediction and an accuracy of the language identification model in correctly predicting a language of the second text string; and
providing the language prediction of the first text string to a network service.

2. The system of claim 1, wherein the operations further comprise:
identifying one or more named entities in the first text string; and
removing the one or more named entities from the first text string prior to applying the plurality of language identification models to the first text string.

3. The system of claim 1, wherein the operations further comprise:
determining a gradient boosting value for each of the plurality of language identification models based on the accuracy of each corresponding language identification model in predicting the language of the second text string; and
weighting the confidence score associated with each candidate language prediction based on the gradient boosting value of the corresponding language identification model.

4. The system of claim 1, wherein the operations further comprise:
applying the plurality of language identification models to the second text string;
determining an accuracy of each of the plurality of language identification models in predicting a language of the second text string by comparing respective predicted languages of the second text string provided by each of the plurality of language identification models with a known language of the second text string;
calculating a gradient boosting value for each of the plurality of language identification models based on the respective accuracy of each of the plurality of language identification models in predicting the language of the second text string; and
weighting the confidence score associated with each candidate language prediction based on the gradient boosting value of the corresponding language identification model.

5. The system of claim 1, wherein the second text string is included in a training data set used to train at least one of the plurality of language identification models, the training data set including a plurality of text strings including the second text string.

6. The system of claim 1, wherein the network service is operable to perform a language processing service with respect to the first text string based on the language prediction of the first text string.

7. The system of claim 6, wherein the network service is selected from a group comprising a translation service, a spam detection service, a profanity detection service, and a gibberish detection service.

8. The system of claim 1, wherein the operations further comprise receiving, from the network service, the first text string via an application programming interface (API), as part of a request for language identification.

9. The system of claim 8, wherein the network service receives the first text string as a search query entered by a user.

10. The system of claim 8, wherein the network service extracts the first text string from content generated by a user.

11. A method comprising:
accessing a plurality of candidate language predictions for a first text string produced as a result of applying a plurality of language identification models to the first text string, each of the plurality of candidate language predictions having an associated confidence score produced by a corresponding language identification model, each confidence score indicating a likelihood that the corresponding candidate language prediction is accurate;
identifying, by one or more processors of a machine and based on the first text string, a second text string from a set of one or more text strings previously evaluated by the plurality of language identification models;
selecting, by the one or more processors of the machine, from among the plurality of candidate language predictions, a language prediction of the first text string produced by a language identification model among the plurality of language identification models based on a confidence score associated with the language prediction and an accuracy of the language identification model in correctly predicting a language of the second text string; and
providing the language prediction of the first text string to a network service.

12. The method of claim 11, further comprising:
identifying one or more named entities in the first text string; and
removing the one or more named entities from the first text string prior to applying the plurality of language identification models to the first text string.

13. The method of claim 11, further comprising:
determining a gradient boosting value for each of the plurality of language identification models based on the accuracy of each corresponding language identification model in predicting the language of the second text string; and
weighting the confidence score associated with each candidate language prediction based on the gradient boosting value of the corresponding language identification model.

14. The method of claim 11, further comprising:
applying the plurality of language identification models to the second text string;
determining an accuracy of each of the plurality of language identification models in predicting a language of the second text string by comparing respective predicted languages of the second text string provided by each of the plurality of language identification models with a known language of the second text string;

calculating a gradient boosting value for each of the plurality of language identification models based on the respective accuracy of each of the plurality of language identification models in predicting the language of the second text string; and weighting the confidence score associated with each candidate language prediction based on the gradient boosting value of the corresponding language identification model.

15. The method of claim 11, wherein the second text string is included in a training data set used to train at least one of the plurality of language identification models.

16. The method of claim 11, further comprising:

providing the selected predicted language of the first text string to the network service for processing of the first text string, the network service operable to perform a language processing service with respect to the first text string based on the language prediction of the first text string.

17. The method of claim 16, wherein the network service is selected from a group comprising a translation service, a spam detection service, a profanity detection service, a gibberish detection service, and a search service.

18. The method of claim 11, further comprising receiving, from the network service, the first text string via an application programming interface (API), as part of a request for language identification.

19. The method of claim 18, wherein the network service extracts the first text string from user input.

20. A machine-readable storage device embodying instructions that, when executed by one or more hardware processors, cause the one or more hardware processors to perform operations comprising:

receiving user generated content that includes a first text string;

predicting a language of the first text string based on a plurality of language predictions produced by a plurality of language identification models, identifying, based on the first text string, a second text string from a set of one or more text strings previously evaluated by the plurality of language identification models, and selecting a language prediction based on an accuracy of a corresponding language identification model in correctly predicting a language of the second text string;

generating, by at least one network-based language processing service, modified content based on the user generated content and the predicted language of the first text string; and electronically publishing the modified content by a network-based content publisher.

* * * * *